United States Patent
Ding et al.

(10) Patent No.: US 11,758,481 B2
(45) Date of Patent: Sep. 12, 2023

(54) INDEPENDENT SIDELINK (SL) DISCONTINUOUS RECEPTION (DRX)

(71) Applicant: QUALCOMM Incorporated, San Diego, CA (US)

(72) Inventors: Ling Ding, Chester, NJ (US); Junyi Li, Franklin Park, NJ (US); Sony Akkarakaran, Poway, CA (US); Jung Ho Ryu, Fort Lee, NJ (US); Qian Zhang, Basking Ridge, NJ (US); Tianyang Bai, Somerville, NJ (US); Kiran Venugopal, Raritan, NJ (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 17/153,097

(22) Filed: Jan. 20, 2021

(65) Prior Publication Data
US 2021/0306948 A1 Sep. 30, 2021

Related U.S. Application Data

(60) Provisional application No. 63/000,376, filed on Mar. 26, 2020.

(51) Int. Cl.
*H04W 52/02* (2009.01)
*H04L 1/1812* (2023.01)
(Continued)

(52) U.S. Cl.
CPC ....... *H04W 52/0235* (2013.01); *H04L 1/1812* (2013.01); *H04W 52/0241* (2013.01); *H04W 72/20* (2023.01); *H04W 76/28* (2018.02)

(58) Field of Classification Search
None
See application file for complete search history.

(56) References Cited

U.S. PATENT DOCUMENTS

| | | | |
|---|---|---|---|
| 2016/0142974 A1* | 5/2016 | Lindoff | H04W 56/00 370/311 |
| 2022/0164020 A1* | 5/2022 | Su | G06F 1/3287 |
| 2023/0024646 A1* | 1/2023 | Park | H04W 76/28 |

FOREIGN PATENT DOCUMENTS

| | | |
|---|---|---|
| CN | 109041146 B | 3/2020 |
| EP | 3500028 A1 | 6/2019 |

OTHER PUBLICATIONS

Intel Corporation, et al., "DRX in Sidelink", 3GPP TSG RAN WG2#97, 3GPP Draft; R2-1701309, 3rd Generation Partnership Project (3GPP), Athens, Greece; Feb. 13-17, 2017, 2 Pages, XP051211974, Retrieved from the Internet: URL: http://www.3gpp.org/ftp/Meetings_3GPP_SYNC/RAN2/Docs/ [retrieved on Feb. 12, 2017].

(Continued)

*Primary Examiner* — Robert M Morlan
(74) *Attorney, Agent, or Firm* — Seyfarth Shaw LLP

(57) ABSTRACT

A method of wireless communications by a sidelink UE (user equipment) includes receiving a first signal as part of a discontinuous reception (DRX) wake-up procedure at the beginning of a sidelink discontinuous reception (DRX) ON duration. The method also includes transmitting a response to the first signal as part of a DRX wake-up procedure. The method further includes starting a timer after sending the response. The method still further includes entering a sleep state upon not receiving a physical sidelink control channel (PSCCH) or physical sidelink shared channel (PSSCH) before the timer expires.

30 Claims, 12 Drawing Sheets

(51) Int. Cl.
*H04W 76/28* (2018.01)
*H04W 72/20* (2023.01)

(56) References Cited

OTHER PUBLICATIONS

International Search Report and Written Opinion—PCT/US2021/020067—ISA/EPO—dated Jun. 11 2021.
LG Electronics Inc: "Discussion on Sidelink DRX", 3GPP TSG-RAN WG2 Meeting #112 electronic, 3GPP Draft; R2-2008943, 3rd Generation Partnership Project (3GPP), Online, Nov. 2-13, pp. 1-6, XP051941993, Retrieved from the Internet: URL: https://ftp.3gpp.org/tsg_ran/WG2_RL2/TSGR2_112-e/Docs/R2-2008943.zip R2-2008943—Discussion on Sidelink DRX.DOCX [retrieved on Oct. 23, 2020].

\* cited by examiner

INDEPENDENT SIDELINK (SL) DISCONTINUOUS RECEPTION (DRX)

CROSS-REFERENCE TO RELATED APPLICATION

The present application claims the benefit of U.S. Provisional Patent Application No. 63/000,376, filed on Mar. 26, 2020, and titled "INDEPENDENT SIDELINK (SL) DISCONTINUOUS RECEPTION (DRX)," the disclosure of which is expressly incorporated by reference it its entirety.

FIELD OF THE DISCLOSURE

Aspects of the present disclosure generally relate to wireless communications, and more particularly to techniques and apparatuses for 5G new radio (NR) independent sidelink (SL) discontinuous reception (DRX) procedures for sidelink communications.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of peer-to-peer communications systems, such as vehicle related communications systems (e.g., vehicle-to-everything (V2X) communications systems). In some cases, vehicles may communicate directly with each other using device-to-device (D2D) communications over a D2D wireless link. As the demands for peer-to-peer communications (or D2D communications) increase, power savings becomes increasingly important. Accordingly, there is a need to improve power savings during peer-to-peer wireless communications.

SUMMARY

In one aspect of the present disclosure, a method of wireless communications by a sidelink UE (user equipment) includes receiving a first signal as part of a discontinuous reception (DRX) wake-up procedure at the beginning of a sidelink DRX ON duration. The method also includes transmitting a response to the first signal as part of a DRX wake-up procedure. The method also includes starting a timer after sending the response. The method further includes entering a sleep state upon not receiving a physical sidelink control channel (PSCCH)/physical sidelink shared channel (PSSCH) before the timer expires.

In another aspect of the present disclosure, sidelink UE (user equipment) for wireless communications includes a memory and at least one processor operatively coupled to the memory. The memory and the at least one processor are configured to receive a first signal as part of a discontinuous reception (DRX) wake-up procedure at the beginning of a sidelink DRX ON duration. The UE also transmits a response to the first signal as part of a DRX wake-up procedure. The UE starts a timer after sending the response. The UE enters a sleep state upon not receiving a physical sidelink control channel (PSCCH)/physical sidelink shared channel (PSSCH) before the timer expires.

In another aspect of the present disclosure, a sidelink (SL) UE includes means for receiving a first signal as part of a discontinuous reception (DRX) wake-up procedure at the beginning of a sidelink discontinuous reception (DRX) ON duration. The SL UE also includes means for transmitting a response to the first signal as part of a DRX wake-up procedure. The SL UE also includes means for starting a timer after sending the response. The UE further includes means for entering a sleep state upon not receiving a physical sidelink control channel (PSCCH)/physical sidelink shared channel (PSSCH) before the timer expires.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
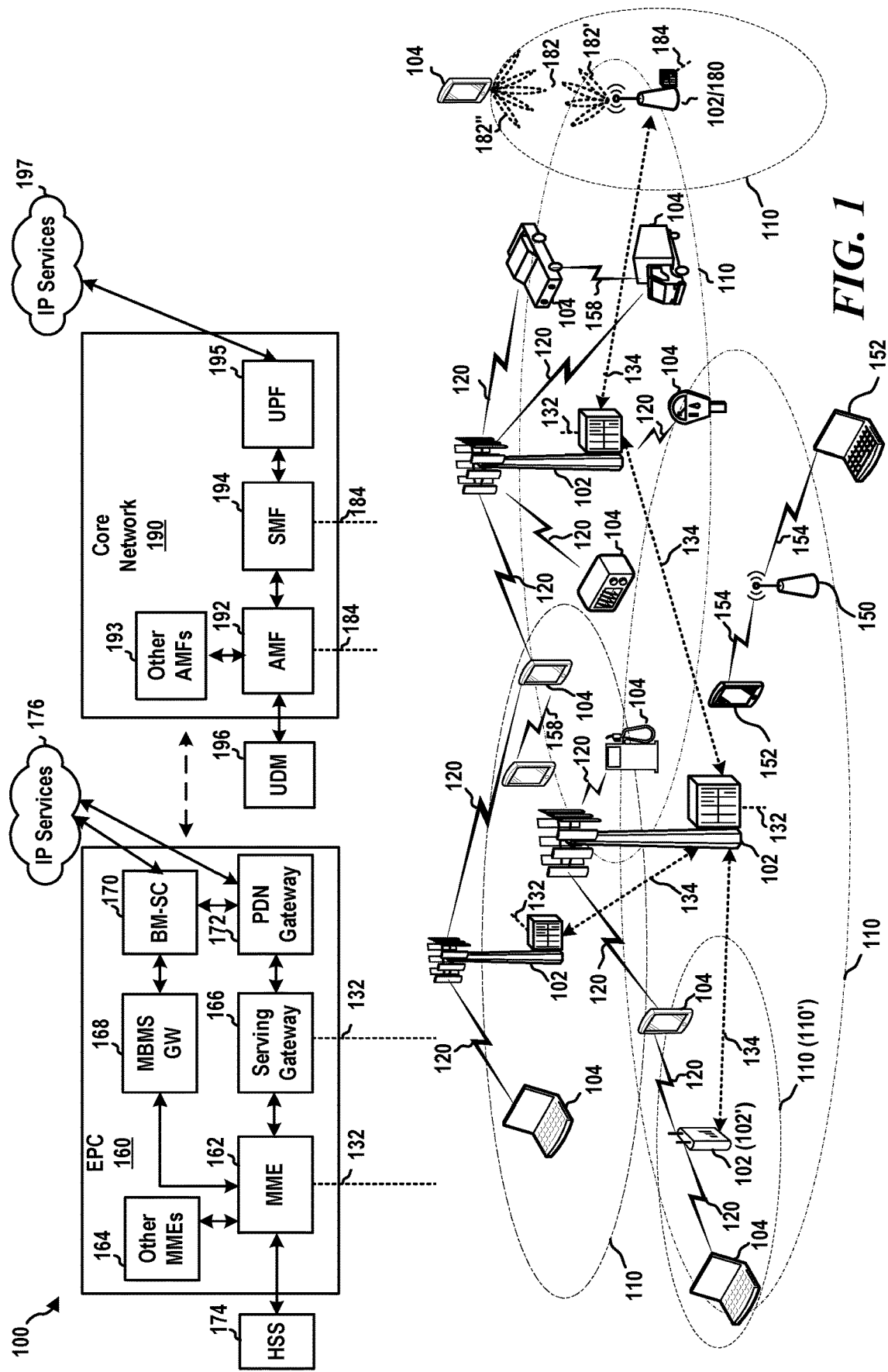
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

To improve the relatability of sidelink transmissions, UEs may inter-coordinate to share resource information. That is, a first UE may identify communications resources. The communications resources identified by the first UE may be referred to as sensing information. The first UE may transmit the sensing information (e.g., identified communications resources) to a second UE. The second UE may consider the sensing information when selecting resources for a sidelink transmission.

Aspects of the present disclosure present an independent sidelink (SL) discontinuous reception (DRX) procedure to save power for sidelink UEs. Here, independent SL DRX means no existence of a Uu connection (connection to a base station) or Uu DRX cycle (DRX cycle for base station communications). The present disclosure is effective when one UE is communicating with one or more UEs over an SL. The present disclosure is particularly applicable to scheduling mode-2 communications. Mode-2 communications are communications where resources are not assigned by a base station. Rather, UEs autonomously select resources from a resource pool.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., Si interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, aspects of the disclosure may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgement (ACK/NACK) feedback. The PUSCH carries data, and may additionally be used to carry a buffer status report (BSR), a power headroom report (PHR), and/or UCI.

Figure 3:
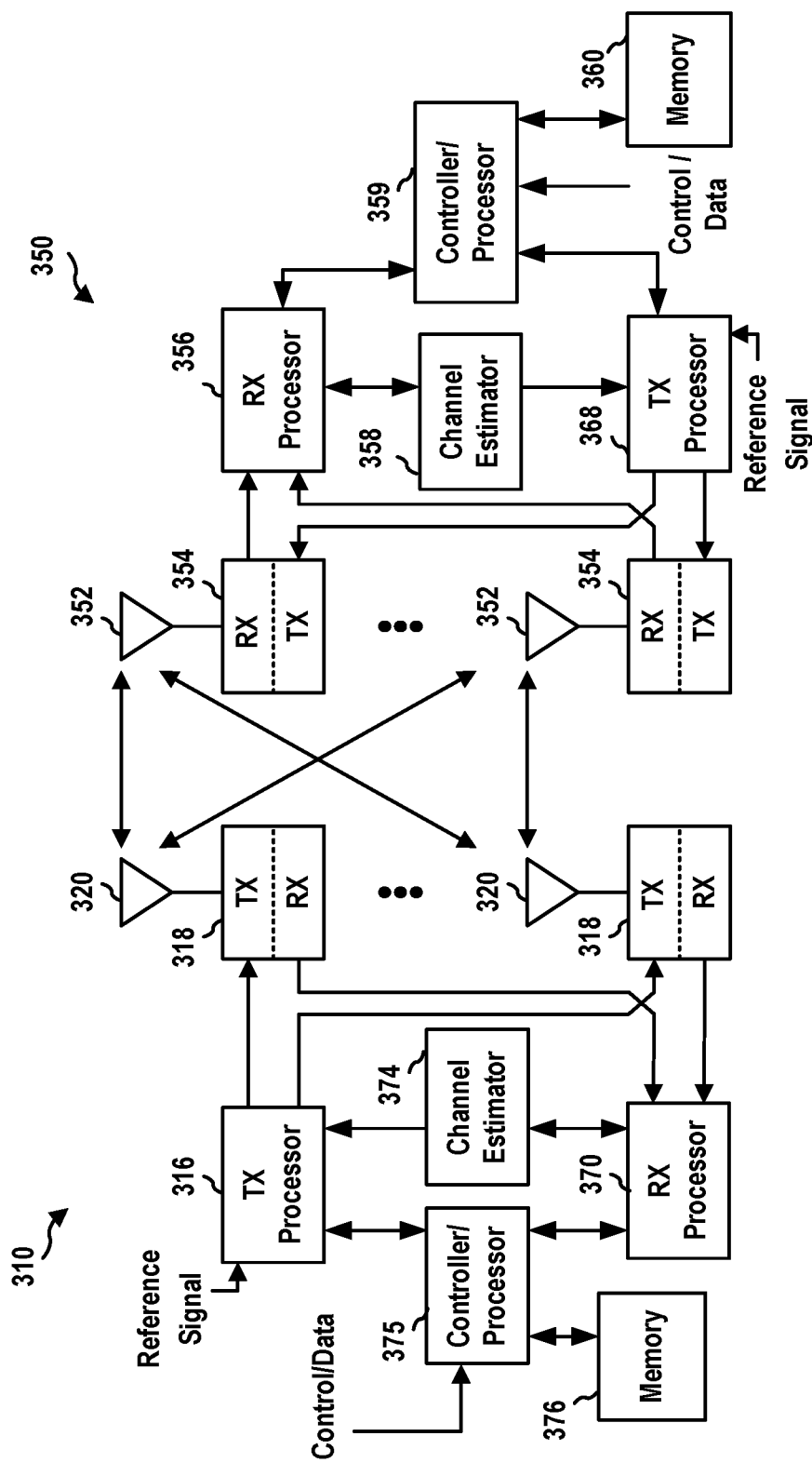
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, the UE 104, 350 may include means for receiving, means for transmitting, means for starting, means for entering a sleep state, and means for staying awake. Such means may include one or more components of the UE 104, 350 described in connection with FIGS. 1 and 3.

Figure 4:
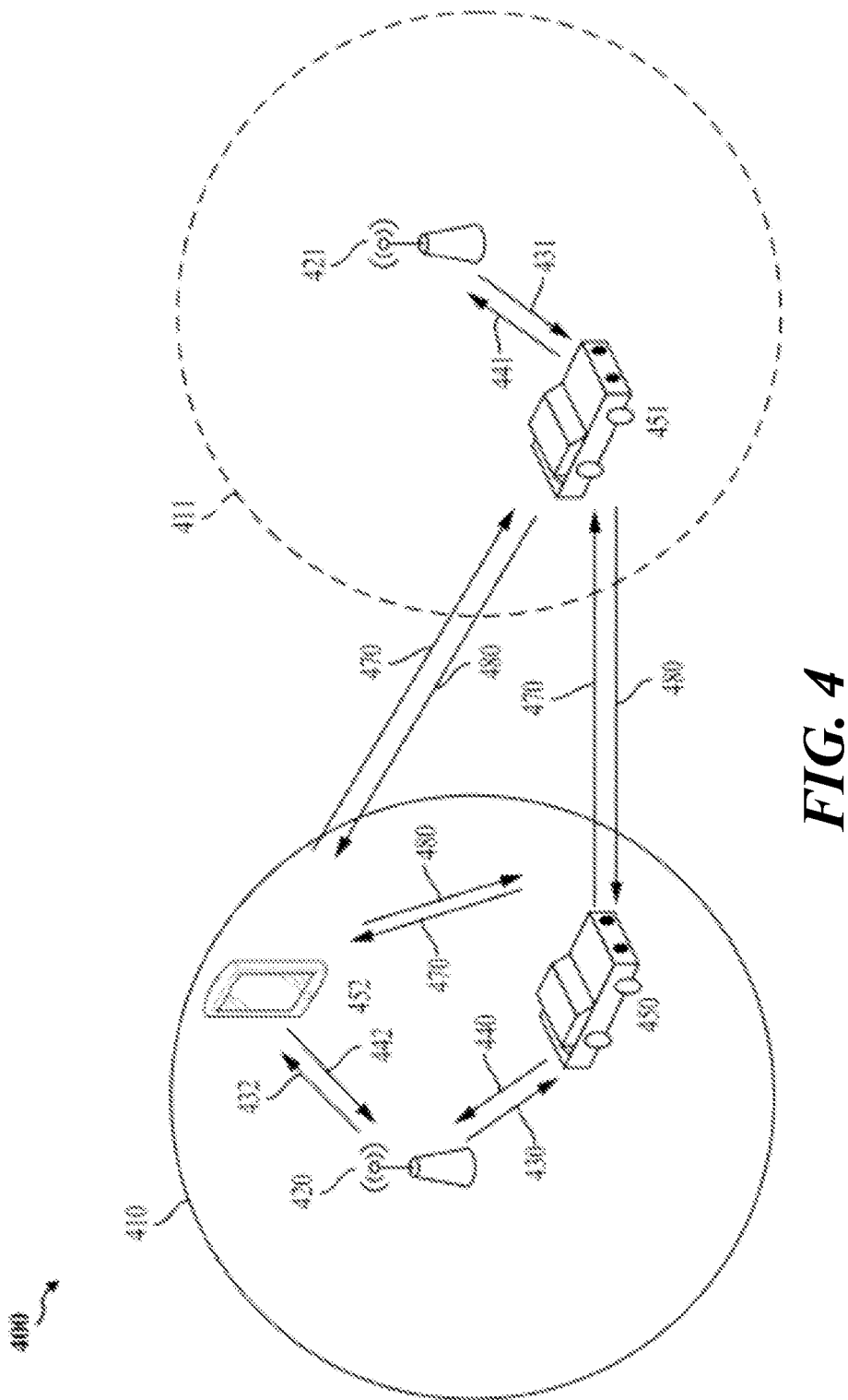
FIG. 4 is a diagram illustrating an example of a vehicle-to-everything (V2X) system, in accordance with various aspects of the present disclosure.

FIG. 4 is a diagram of a device-to-device (D2D) communications system 400, in accordance with various aspects of the present disclosure. For example, the D2D communications system 400 may include V2X communication, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communication, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the base stations may schedule sidelink communications between or among the UEs 450, 451 in a licensed radio frequency spectrum and/or a shared radio frequency spectrum (e.g., 5 GHz radio spectrum bands). This is referred to as scheduling mode-1 communications.

The shared radio frequency spectrum may be unlicensed, and therefore different technologies may use the shared radio frequency spectrum for communications. In some aspects, D2D communications (e.g., sidelink communications) between or among UEs 450, 451 is not scheduled by base stations. This is referred to as scheduling mode-2 communications, where the UEs autonomously schedule resources themselves.

The D2D communications system 400 may further include a third UE 452. The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

Figure 2:
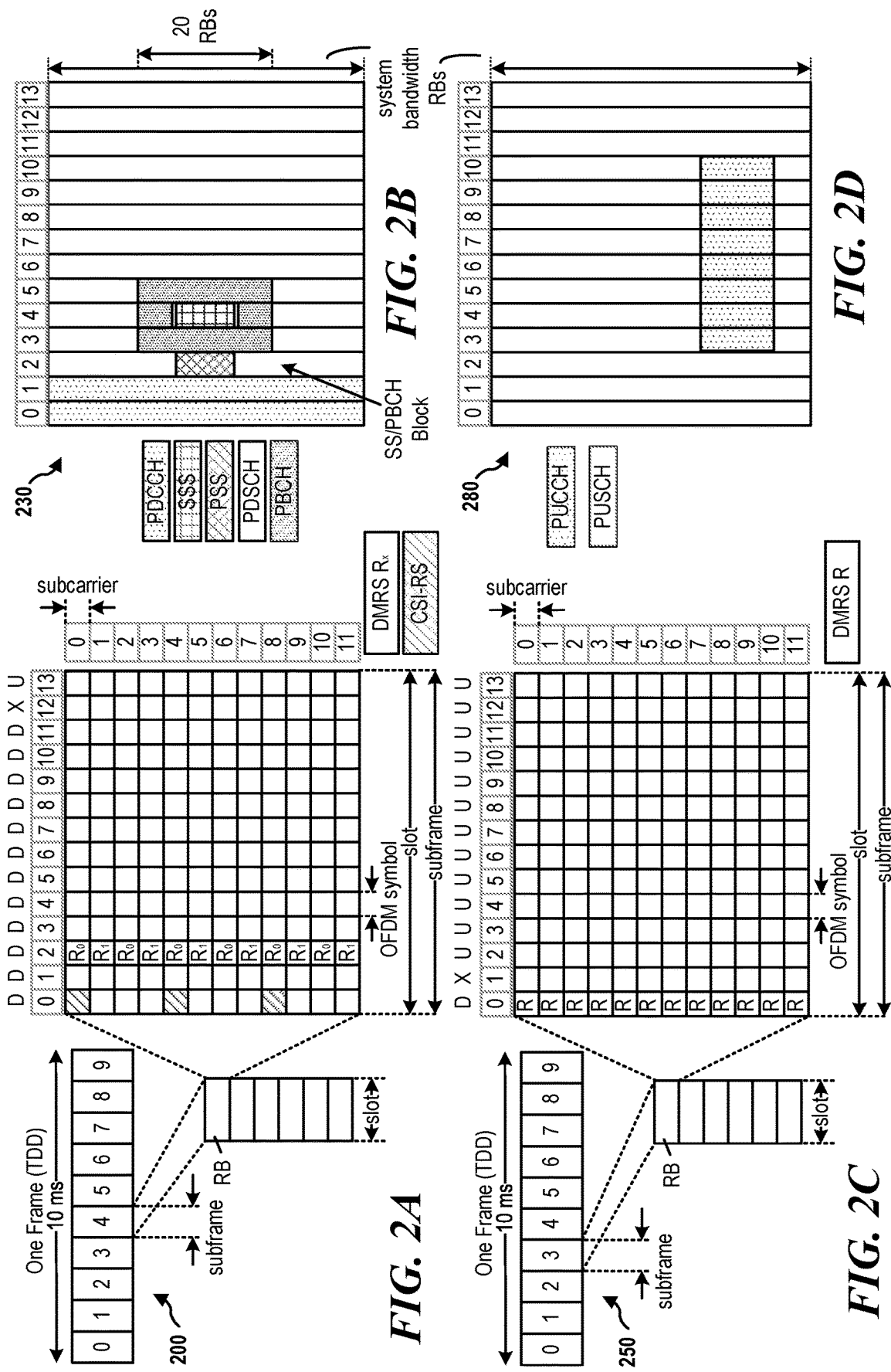
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In scheduling mode-1 systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more FDM channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452).

In a discontinuous reception (DRX) mode of operation, a UE may enter a low power ("sleep") mode, which may also be referred to as a low power state, for a certain period of time (referred to as a DRX OFF period, phase, or duration) and wake up again during a DRX ON period to check if there is any data to be received. The cycle of sleep and wake-up (DRX ON and DRX OFF) periods repeats over time, allowing the UE to save power while maintaining connectivity.

Figure 5:
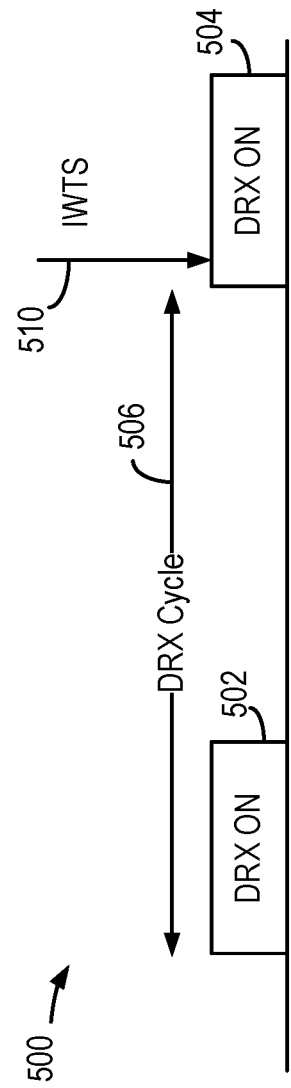
FIG. 5 is a diagram illustrating a discontinuous reception (DRX) cycle, in accordance with various aspects of the present disclosure.

FIG. 5 illustrates an example DRX configuration 500 of a UE. As illustrated, the DRX configuration 500 may include DRX ON periods 502, 504. As described, a DRX ON period repeats every DRX cycle 506. For example, the DRX ON period 502 is during the DRX cycle 506. The UE is awake during the DRX ON periods 502, 504 to monitor for signaling that may be received, and in a low power state (e.g., sleep mode) at other times.

In some cases, multiple UEs in sidelink (SL) communication may be configured with DRX. In some cases, a wake-up procedure can include beam sweeping to facilitate communication between the SL UEs. A UE transmitting signals for beam sweeping may be referred to as a transmit (TX) UE, and a UE receiving the signals may be referred to as a receive (RX) UE. For example, an RX UE may receive from a TX UE "I want to send" signaling (IWTS) 510 at a beginning of the DRX ON period 504, indicating the TX UE has data to send. The IWTS signaling 510 may also be used for beam management.

For a Uu link, a UE communicates with a base station (BS) and has one DRX setting (e.g., the DRX setting with the base station). However, for SL communications, the UE may be in communication with multiple UEs and may have multiple DRX settings (e.g., one DRX setting for each UE pair). According to the present disclosure, the DRX ON durations of the UEs in SL communication are aligned.

In some aspects, DRX ON periods may be aligned over different TX UEs in a time-orthogonal manner. For a given RX UE, there may be only one TX UE at one DRX ON phase, and beam management/sweeping may be performed independently for different TX UEs (e.g., beam sweeping may be performed for UE pairs one at a time). This may be similar to beam management on the Uu link. However, this option for SL communications is costly from power consumption and processing power viewpoints because there may be multiple SL UEs communicating with one SL UE. Moreover, the likelihood of a TX UE contacting an RX UE may be relatively low during any given DRX ON phase. Therefore, according to the present disclosure, it is assumed that one DRX setting for an RX UE (e.g., UE0) is the same for all TX UEs.

Aspects of the present disclosure include an independent SL DRX procedure to save UE power. Here independent SL DRX means no existence of Uu connection or Uu DRX. The present disclosure is effective when one UE (e.g., UE0) is communicating with one or more UEs (e.g., UE1, UE2, UE3) over a SL. The present disclosure is particularly applicable to scheduling mode-2 communications. Mode-2 communications are communications where resources are not assigned by a base station. Rather, UEs autonomously select resources from a resource pool.

At the beginning of a DRX ON duration, a DRX wake-up procedure takes place between the RX UE (e.g., UE0) and the TX UE. For FR2 (frequency range two-millimeter wave) scenarios, the wake-up procedure can include beam training or some other form of initialization that takes place for beam alignment between the TX UE (e.g., UE1) and the RX UE (e.g., UE0). For FR1 (frequency range one–sub 6 GHz) scenarios, there is no beam sweeping.

Figure 6:
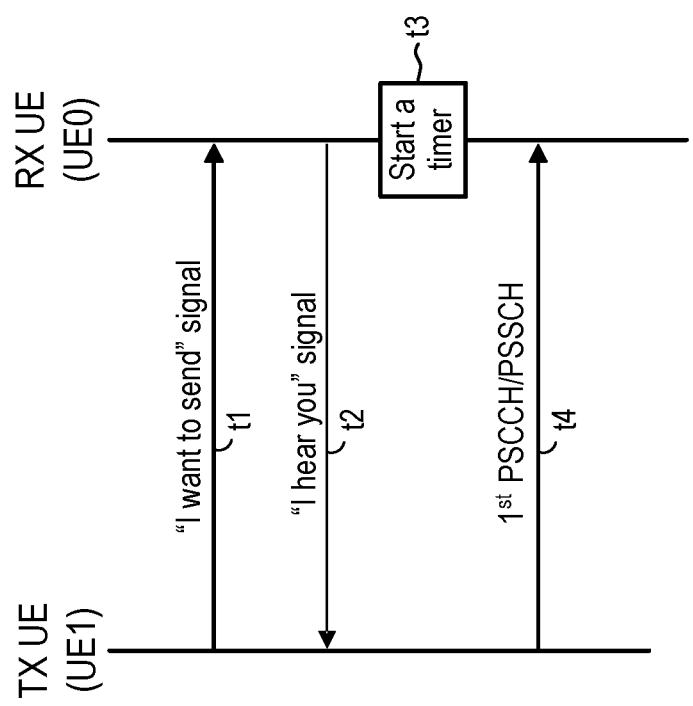
FIG. 6 is a diagram illustrating a DRX wake-up procedure, in accordance with aspects of the present disclosure.

FIG. 6 is a diagram illustrating a DRX wake-up procedure, in accordance with aspects of the present disclosure. As noted above with respect to FIG. 5 and illustrated in more detail in FIG. 6, a TX UE (e.g., UE1) sends an "I want to send" (IWTS) signal if the TX UE has data to send at time t1. An RX UE (e.g., UE0) responds back with an "I hear you" signal at time t2. At time t3, the RX UE (e.g., UE0) starts a timer and waits to receive data from the TX UE (e.g., UE1). For example, the RX UE (e.g., UE0) waits for the TX UE (e.g., UE1) to send a first PSCCH/PSSCH at time t4, as described in more detail in U.S. patent application No. 62/983,286 filed on Feb. 28, 2020, entitled "Beam Training for Sidelink (SL) Configured with Discontinuous Reception (DRX)," the disclosure of which is expressly incorporated by reference in its entirety.

Figure 7:
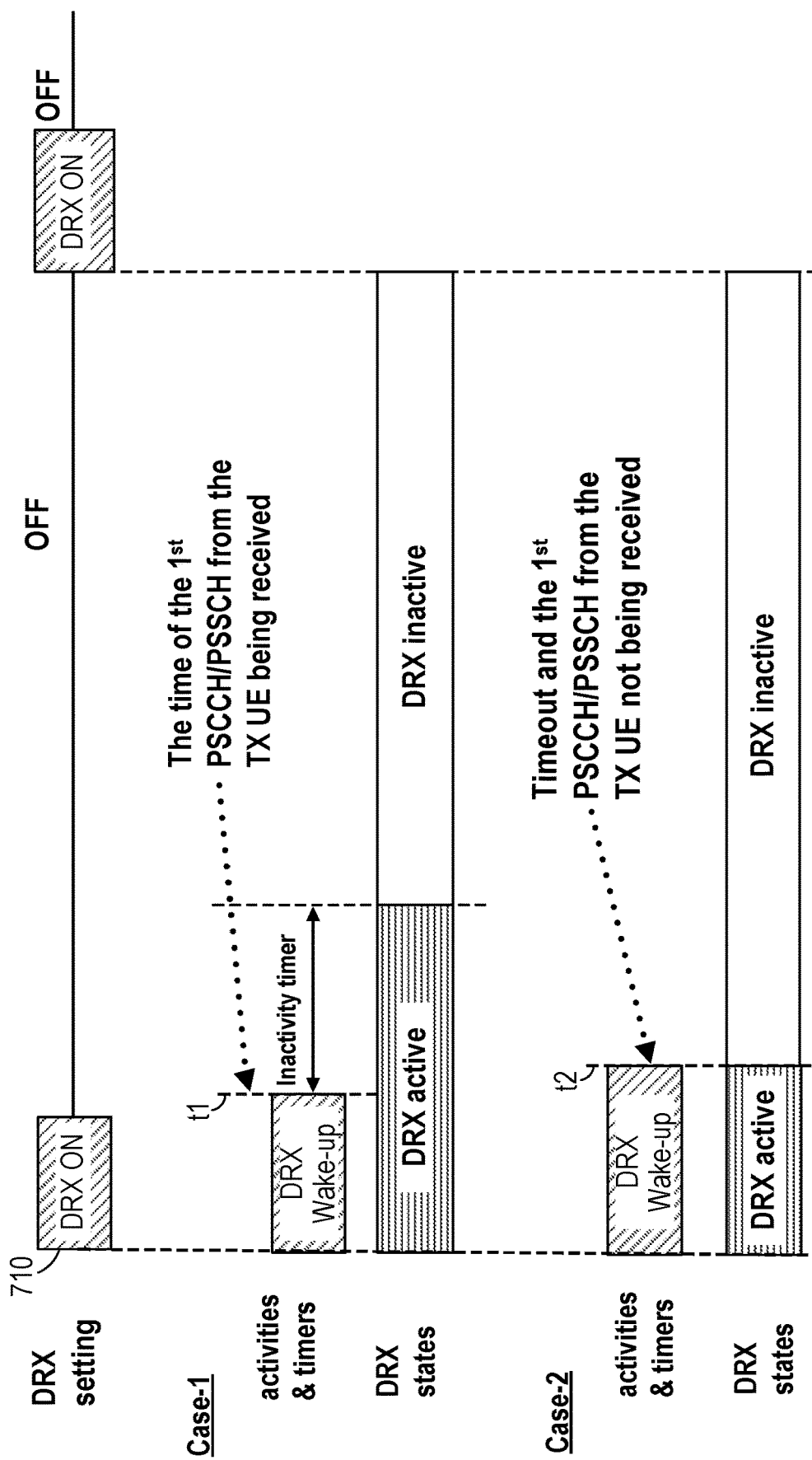
FIG. 7 is a diagram illustrating a DRX cycle with various activities and timers, in accordance with aspects of the present disclosure.

FIG. 7 is a diagram illustrating a DRX cycle with various activities and timers, in accordance with aspects of the present disclosure. A UE (e.g., UE0) operates in accordance with a DRX setting 710 including a DRX ON state and a DRX OFF state. As illustrated in FIG. 7, the UE is active in the DRX wake-up stage during the sidelink DRX ON duration. In Case-1, if a physical sidelink channel (e.g., first PSCCH/PSSCH) is received before the timer of FIG. 6 times out, then an RX UE (e.g., UE0) starts a sidelink inactivity timer at time t1. After the timer of FIG. 6 expires and no first physical sidelink channel is received (e.g., when the TX UE (UE1) has no data to send), the RX UE (e.g., UE0) may sleep (e.g., enter a DRX inactive state), as illustrated in FIG. 7 at time t2, Case-2. In other words, if a timeout occurs and no physical sidelink channel is received, then the RX UE (e.g., UE0) goes to sleep if there is no ongoing timer requiring the RX UE to be in a DRX active state.

New sidelink (SL) timers are now discussed, in accordance with the present disclosure. A sidelink on duration timer (SL drx-onDurationTimer), sidelink inactivity timers for the transmitter and receiver (SL drx-InactivityTimer-TX/SL drx-InactivityTimer-RX), sidelink HARQ timers for the transmitter and receiver (SL drx-HARQ-RTT-Timer-TX/SL drx-HARQ-RTT-Timer-RX), and sidelink retransmission timers for the transmitter and receiver (SL drx-RetransmissionTimer-TX/SL drx-RetransmissionTimer-RX) are introduced.

According to aspects of the present disclosure, the time location (e.g., offset and duration) of the SL drx-onDurationTimer accounts for preconfigured PSCCH/PSSCH resource settings. In other words, a PSCCH/PSSCH resource should coincide with each drx-onDuration.

In another aspect of the present disclosure, the SL drx-onDurationTimer, SL drx-InactivityTimer-TX/RX and SL drx-RetransmissionTimer-TX/RX are preconfigured. In particular, their duration is preconfigured.

In yet another aspect, the minimal duration of the SL drx-HARQ-RTT-Timer-TX/RX is preconfigured. The actual timer duration is dynamically adjusted so that there is a PSCCH/PSSCH resource during the incoming duration of the SL drx-RetransmissionTimer-TX/RX.

The duration for each of the above timers (SL drx-onDurationTimer, SL drx-InactivityTimer-TX/RX, SL drx-RetransmissionTimer-TX/RX, and minimal value of SL drx-HARQ-RTT-Timer-TX/RX) may be preconfigured for each link (e.g., UE1, UE2, etc.), or per link-type (e.g., type=unicast vs. groupcast, sidelink or Uu), per traffic type (e.g., voice or data), or per UE (e.g., the same for all side links with the RX UE, e.g., UE0).

When to start each timer is similar to as defined for the Uu case, except for sidelink communications, the grant is via PSCCH. In other words, a sidelink DRX ON duration timer starts after drx-SlotOffset from a beginning of a subframe, where the subframe is such that [(subframe number (SFN)×10)+subframe number] modulo (drx-LongCycle)=drx-StartOffset for long DRX cycle, and [(SFN×10)+subframe number] modulo (drx-ShortCycle)=(drx-StartOffset) modulo (drx-ShortCycle) for short DRX cycle (if configured). A time location of the sidelink DRX ON duration timer is the drx-StartOffset and DRX ON duration timer. A sidelink inactivity timer TX starts at a transmission of the PSSCH/PSCCH; and a sidelink inactivity timer-RX starts at reception of the PSSCH/PSCCH. A sidelink DRX HARQ round trip time (RTT) timer TX starts at the transmission of the PSSCH/PSCCH; and a sidelink DRX HARQ RTT timer RX starts at a transmission of a negative acknowledgment (NACK) on a received PSSCH/PSCCH. A sidelink DRX retransmission timer TX starts at expiry of the sidelink DRX HARQ RTT timer TX; and a sidelink DRX retransmission timer RX starts at the expiry of the sidelink DRX HARQ RTT timer RX.

The RX UE (e.g., UE0) can choose to sleep during the SL drx-onDurationTimer, SL drx-InactivityTimer, and SL drx-RetransmissionTimer if there is no pre-configured PSCCH/PSSCH resource during the duration of those timers. The sidelink DRX cycle configuration (e.g., cycle start-offset, DRX-ON duration, DRX-cycle length) can be the same as in the Uu case. In other words, the configuration of the long DRX cycle and optionally the configuration of the short DRX cycle can follow the Uu specifications.

Figure 8:
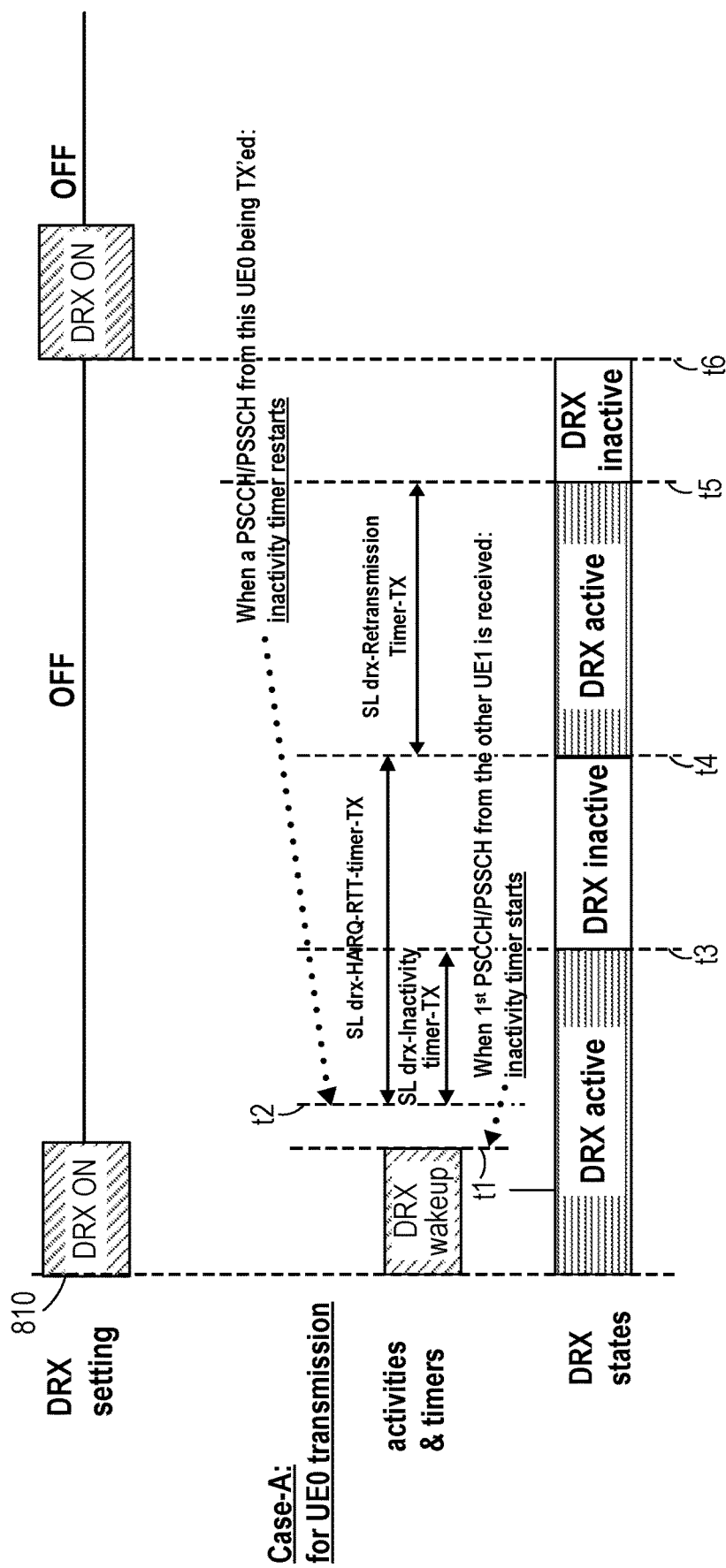
FIG. 8 is a diagram illustrating a DRX cycle with various activities and timers when the UE is transmitting to another UE, in accordance with aspects of the present disclosure.

FIG. 8 is a diagram illustrating a DRX cycle with various activities and timers when a UE is transmitting to another UE, in accordance with aspects of the present disclosure. The UE (e.g., UE0) operates in accordance with a DRX setting 810 including a DRX ON state and a DRX OFF state. Referring to FIG. 8, various activities and timers will now be discussed for the case when the UE0 transmits a physical sidelink channel (e.g., PSCCH/PSSCH) to another UE. After the UE (e.g., UE0) receives the first PSSCH/PSCCH from the other UE (e.g., UE1), an inactivity timer starts at time t1, similar to as discussed with reference to FIG. 7. In this case (Case-A), the UE (UE0) decides to transmit data. Thus, the UE0 allocates resources and transmits the PSCCH/PSSCH, which restarts the inactivity timer-TX at time t2. At the moment the inactivity timer-TX restarts (when the PSCCH/PSSCH is transmitted), the SL drx-HARQ-RTT-timer-TX also starts. The UE0 sleeps when the inactivity timer expires at time t3. After the SL drx-HARQ-RTT-timer-TX expires, the SL drx-RetransmissionTimer-TX starts and the UE0 enters the active state at time t4. Once the SL drx-RetransmissionTimer-TX expires without the UE0 receiving a retransmission, the UE0 returns to sleep mode at time t5. At time t6, the UE awakens in accordance with the DRX setting.

Figure 9:
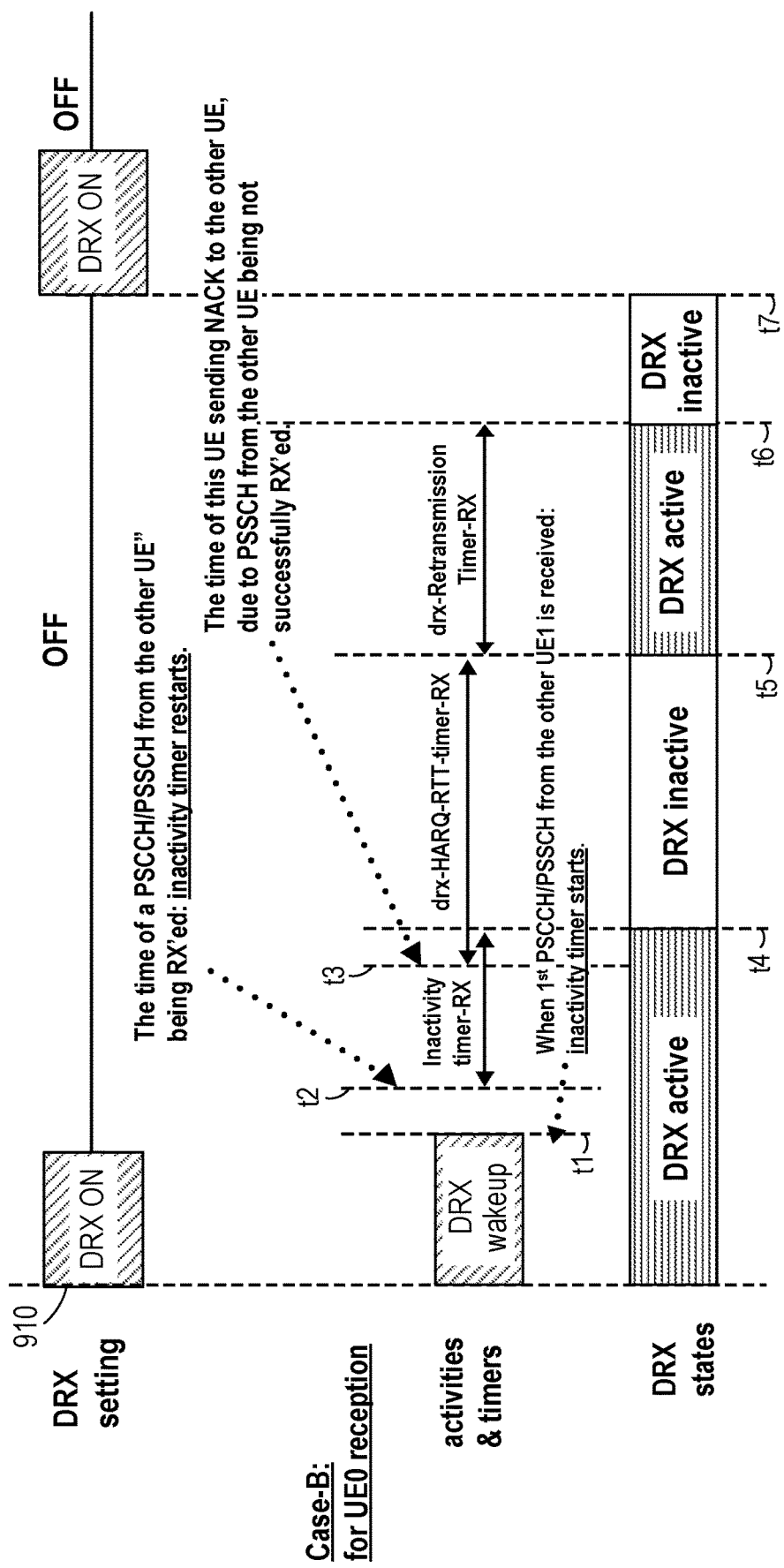
FIG. 9 is a diagram illustrating a DRX cycle with various activities and timers when the UE is receiving from another UE, in accordance with aspects of the present disclosure.

FIG. 9 is a diagram illustrating a DRX cycle with various activities and timers when a UE is receiving from another UE, in accordance with aspects of the present disclosure. The UE (e.g., UE0) operates in accordance with a DRX setting 910 including a DRX ON state and a DRX OFF state. Referring to FIG. 9, various activities and timers will now be discussed for the case when the UE receives a physical sidelink channel (e.g., PSCCH/PSSCH) from another UE. After the UE (e.g., UE0) receives the first PSSCH/PSCCH from the other UE (e.g., UE1), an inactivity timer starts at time t1, similar to as discussed with reference to FIG. 7. In this case (Case-B), the UE receives the PSSCH/PSCCH from the other UE (e.g., UE1) and accordingly restarts the inactivity timer at time t2. When nothing is received, the UE0 sends a negative acknowledgment (NACK) at time t3. The UE0 sends the negative acknowledgment due to not receiving the PSSCH from the other UE (e.g., UE1). The UE0 starts the SL drx-HARQ-RTT-timer-RX and then sleeps at time t4. The UE0 sleeps when the inactivity timer expires until the SL drx-HARQ-RTT-timer-RX expires at time t5. After the SL drx-HARQ-RTT-timer-RX timer expires at time t5, the SL drx-RetransmissionTimer-RX starts and the UE0 wakes up to listen for a retransmission. Once the SL drx-RetransmissionTimer-RX expires without the UE0 receiving a retransmission, the UE0 enters sleep mode at time t6. At time t7, the UE awakens in accordance with the DRX setting.

According to aspects of the present disclosure, random access procedures for sidelink communications are also contemplated. According to this aspect, the UE remains awake throughout the random access procedure. More specifically, the UE remains awake until the final message is sent or received. Depending on the SL random access design, the final message can be message-2 or message-3. Details of sidelink random access procedures can be found in U.S. Provisional Patent Application No. 62/993,460, filed on Mar. 23, 2020, entitled, "Techniques for Performing Random Access Procedures in Sidelink Wireless Communications," the disclosure of which is expressly incorporated by reference in its entirety.

Figure 10A:
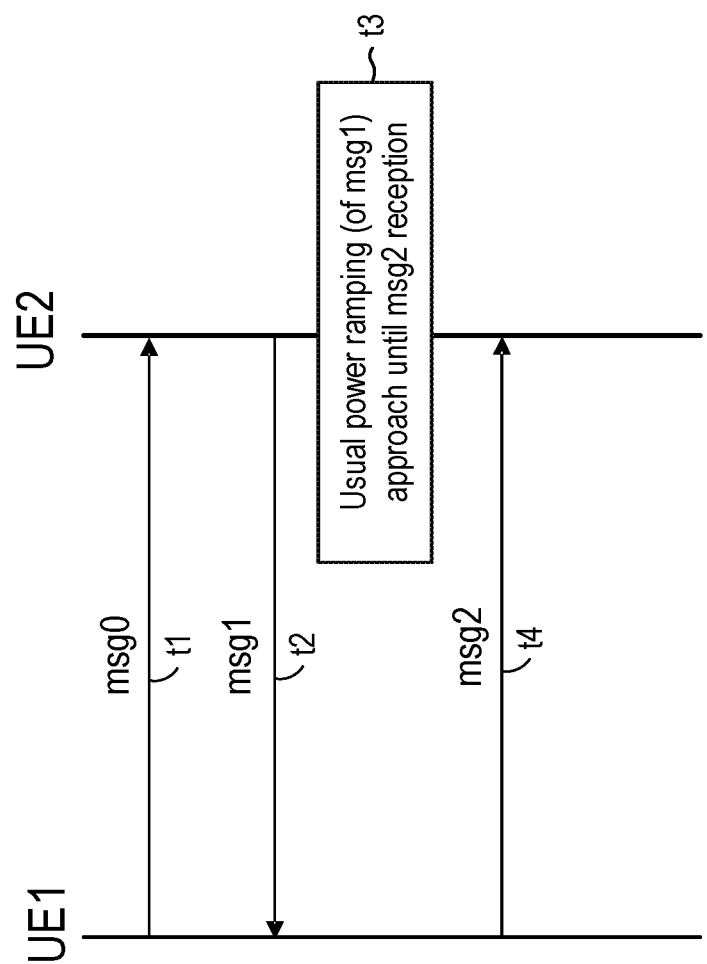
FIGS. 10A and 10B are diagrams illustrating sidelink random access procedures, in accordance with aspects of the present disclosure.
Figure 10B:
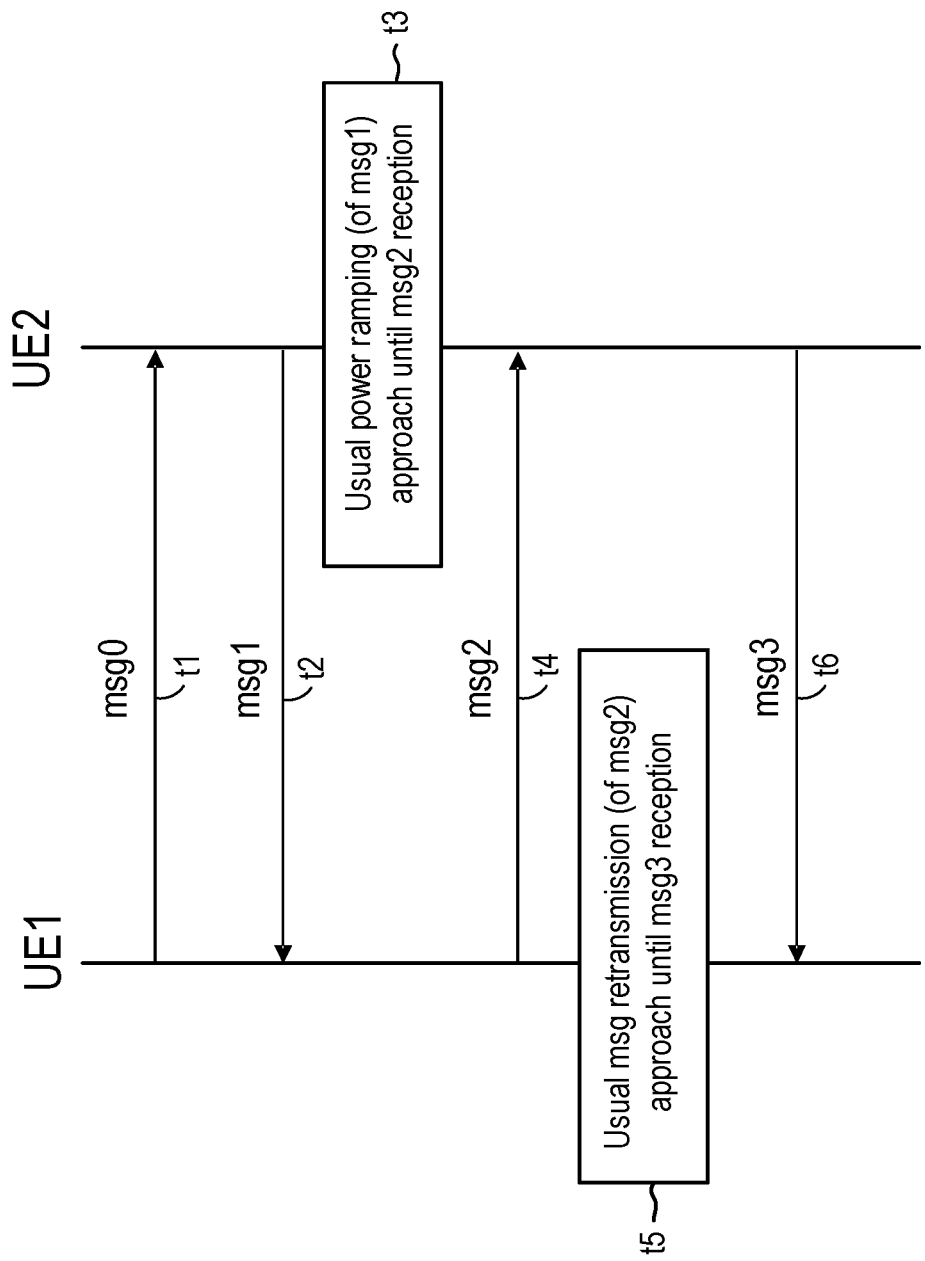

FIGS. 10A and 10B are diagrams illustrating sidelink random access procedures, in accordance with aspects of the present disclosure. Referring to FIG. 10A, a first type of sidelink random access procedure is shown in which the final message is message-2 (msg2). In FIG. 10A, a UE0 can be either UE1 or UE2. According to the procedure illustrated in FIG. 10A, a UE1 transmits a message-0 (msg0) at time t1, and a UE2 responds with a message-one (msg1) at time t2. Power ramping occurs at UE2 at time t3 until a message-two (msg2) is received at time t4. The transmitting UE (UE1) can go to sleep after sending the message-2 at time t4 and the receiving UE can go to sleep after receiving the message-2 at time t4.

FIG. 10B show the same process as described with respect to FIG. 10A for times t1-t4. At time t5, the UE1 performs retransmission of message-2, until message-3 arrives at time t6. The transmitting UE (e.g., UE2) can go to sleep after sending message-3 at time t6. In this case, the receiving UE can go to sleep after receiving message-3 at time t6. In FIG. 10B, the UE0 can be either UE1 or UE2.

As indicated above, FIGS. 5-10B are provided as examples. Other examples may differ from what is described with respect to FIGS. 5-10B.

Figure 11:
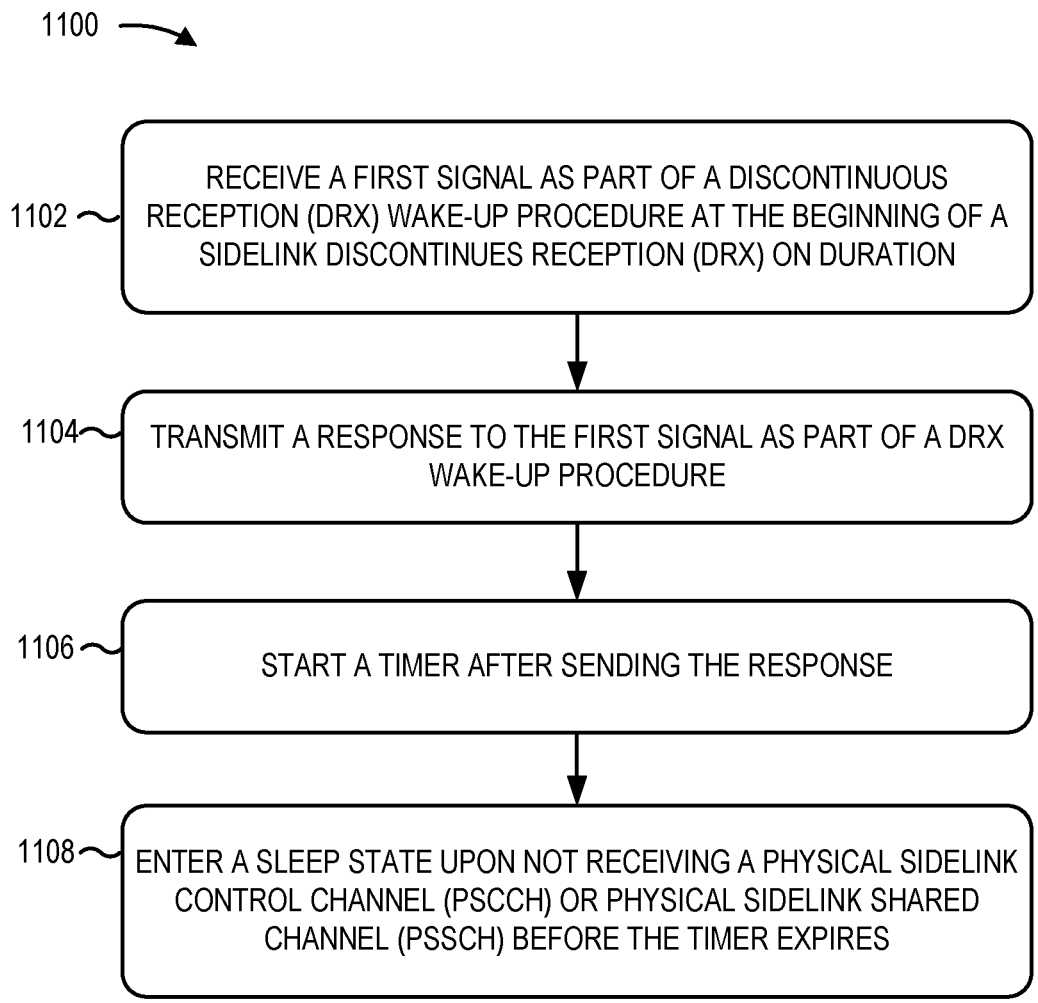
FIG. 11 is a diagram illustrating an example process performed, for example, by a sidelink user equipment, in accordance with various aspects of the present disclosure.

FIG. 11 is a diagram illustrating an example process 1100 performed, for example, by a sidelink UE (user equipment), in accordance with various aspects of the present disclosure. The example process 1100 is an example of independent sidelink (SL) discontinuous reception (DRX).

As shown in FIG. 11, in some aspects, the process 1100 may include receiving a first signal as part of a discontinuous reception (DRX) wake-up procedure at the beginning of a sidelink discontinuous reception (DRX) ON duration (block 1102). For example, the UE (e.g., using the antenna 352, RX 354, RX processor 356, controller processer 359, memory 360, and or the like) can receive the first signal.

As shown in FIG. 11, in some aspects, the process 1100 may include transmitting a response to the first signal as part of a DRX wake-up procedure (block 1104). For example, the UE (e.g., using the antenna 352, TX 354, TX processor 368, controller processer 359, memory 360, and or the like) can transmit the response.

As shown in FIG. 11, in some aspects, the process 1100 may include starting a timer after sending the response (block 1106). For example, the UE (e.g., using the controller processer 359, memory 360, and or the like) can start the timer.

As shown in FIG. 11, in some aspects, the process 1100 may include entering a sleep state upon not receiving a physical sidelink control channel (PSCCH) or physical sidelink shared channel (PSSCH) before the timer expires (block 1108). For example, the UE (e.g., using the controller processer 359, memory 360, and or the like) can enter the sleep state.

Implementation examples are described in the following numbered clauses:

1. A method of wireless communications by a sidelink UE (user equipment), comprising:
    receiving a first signal as part of a discontinuous reception (DRX) wake-up procedure at the beginning of a sidelink DRX ON duration;
    transmitting a response to the first signal as part of a DRX wake-up procedure;
    starting a timer after sending the response; and
    entering a sleep state upon not receiving a physical sidelink channel before the timer expires.
2. The method of clause 1, further comprising:
    receiving the physical sidelink channel before the timer expires; and
    starting a sidelink inactivity timer in response to receiving the physical sidelink channel.

3. The method of clause 2, in which the sidelink inactivity timer, a sidelink DRX ON duration timer, and a sidelink DRX retransmission timer are preconfigured for each link, for each link type, for each traffic type, or for each UE.
4. The method of clause 1, in which a sidelink DRX CycleStartOffset and sidelink DRX ON duration timer are set such that every sidelink DRX ON duration coincides with at least one preconfigured physical sidelink channel resource.
5. The method of clause 1, in which a minimum value of a sidelink DRX hybrid automatic repeat request (HARQ) round trip time (RTT) timer is preconfigured for each link, for each link type, for each traffic type, or for each UE, and an actual value of the sidelink DRX HARQ RTT timer is dynamically adjusted to ensure at least one physical sidelink channel resource coincides with the duration of an incoming sidelink DRX retransmission timer.
6. The method of clause 1, further comprising staying awake during a random access procedure until a last random access message is sent or received.
7. The method of clause 1, in which no preconfigured physical sidelink channel resource coincides with a duration of the respective timer, the method further comprising sleeping during an inactivity timer, a sidelink DRX ON duration timer, or a sidelink DRX retransmission timer.
8. The method of clause 1, in which a sidelink DRX cycle setting is the same for communications with each of a plurality of transmitting UEs.
9. The method of clause 1, in which a sidelink DRX ON duration timer starts after drx-SlotOffset from a beginning of a subframe, where the subframe is such that [(subframe number (SFN)×10)+subframe number] modulo (drx-LongCycle)=drx-StartOffset for long DRX cycle, and [(SFN×10)+subframe number] modulo (drx-ShortCycle)=(drx-StartOffset) modulo (drx-ShortCycle) for short DRX cycle (if configured);
 a sidelink inactivity transmit (TX) timer starts at a transmission of the physical sidelink channel;
 a sidelink inactivity receive (RX) timer starts at reception of the physical sidelink channel;
 a sidelink DRX HARQ RTT TX timer starts at the transmission of the physical sidelink channel;
 a sidelink DRX HARQ RTT RX timer starts at a transmission of a negative acknowledgment (NACK) on a received physical sidelink channel;
 a sidelink DRX retransmission TX timer starts at expiry of the sidelink DRX HARQ RTT TX timer; and
 a sidelink DRX retransmission RX timer starts at the expiry of the sidelink DRX HARQ RTT RX timer.
10. The method of clause 1, in which the physical sidelink channel comprises a physical sidelink control channel (PSCCH).
11. The method of clause 1, in which the physical sidelink channel comprises a physical sidelink shared channel (PSSCH).
12. A sidelink (SL) UE (user equipment) for wireless communication, comprising:
 a memory, and
 at least one processor operatively coupled to the memory, the memory and the at least one processor configured:
 to receive a first signal as part of a discontinuous reception (DRX) wake-up procedure at the beginning of a sidelink DRX ON duration;
 to transmit a response to the first signal as part of a DRX wake-up procedure;
 to start a timer after sending the response; and
 to enter a sleep state upon not receiving a physical sidelink channel before the timer expires.
13. The UE of clause 12, in which the at least one processor is further configured:
 to receive the physical sidelink channel before the timer expires; and
 to start a sidelink inactivity timer in response to receiving the physical sidelink channel.
14. The UE of clause 13, in which the sidelink inactivity timer, a sidelink DRX ON duration timer, and a sidelink DRX retransmission timer are preconfigured for each link, for each link type, for each traffic type, or for each UE.
15. The UE of clause 12, in which a sidelink DRX CycleStartOffset and sidelink DRX ON duration timer are set such that every sidelink DRX ON duration coincides with at least one preconfigured physical sidelink channel resource.
16. The UE of clause 12, in which a minimum value of a sidelink DRX hybrid automatic repeat request (HARQ) round trip time (RTT) timer is preconfigured for each link, for each link type, for each traffic type, or for each UE, and an actual value of the sidelink DRX HARQ RTT timer is dynamically adjusted to ensure at least one physical sidelink channel resource coincides with the duration of an incoming sidelink DRX retransmission timer.
17. The UE of clause 12, in which the at least one processor is further configured to stay awake during a random access procedure until a last random access message is sent or received.
18. The UE of clause 12, in which no preconfigured physical sidelink channel resource coincides with a duration of the respective timer, the at least one processor further configured to sleep during an inactivity timer, a sidelink DRX ON duration timer, or a sidelink DRX retransmission timer.
19. The UE of clause 12, in which a sidelink DRX cycle setting is the same for communications with each of a plurality of transmitting UEs.
20. The UE of clause 12, in which a sidelink DRX ON duration timer starts after drx-SlotOffset from a beginning of a subframe, where the subframe is such that [(subframe number (SFN)×10)+subframe number] modulo (drx-LongCycle)=drx-StartOffset for long DRX cycle, and [(SFN x 10)+subframe number] modulo (drx-ShortCycle)=(drx-StartOffset) modulo (drx-ShortCycle) for short DRX cycle (if configured);
 a sidelink inactivity transmit (TX) timer starts at a transmission of the physical sidelink channel;
 a sidelink inactivity receive (RX) timer starts at reception of the physical sidelink channel;
 a sidelink DRX HARQ RTT TX timer starts at the transmission of the physical sidelink channel;
 a sidelink DRX HARQ RTT RX timer starts at a transmission of a negative acknowledgment (NACK) on a received physical sidelink channel;
 a sidelink DRX retransmission TX timer starts at expiry of the sidelink DRX HARQ RTT TX timer; and
 a sidelink DRX retransmission RX timer starts at the expiry of the sidelink DRX HARQ RTT RX timer.
21. The UE of clause 12, in which the physical sidelink channel comprises a physical sidelink control channel (PSCCH).

22. The UE of clause 12, in which the physical sidelink channel comprises a physical sidelink shared channel (PSSCH).

23. A sidelink (SL) UE (user equipment) for wireless communication, comprising:
    means for receiving a first signal as part of a discontinuous reception (DRX) wake-up procedure at the beginning of a sidelink DRX ON duration;
    means for transmitting a response to the first signal as part of a DRX wake-up procedure;
    means for starting a timer after sending the response; and
    means for entering a sleep state upon not receiving a physical sidelink channel before the timer expires.

24. The UE of clause 23, further comprising:
    means for receiving the physical sidelink channel before the timer expires; and
    means for starting a sidelink inactivity timer in response to receiving the physical sidelink channel.

25. The UE of clause 24, in which the sidelink inactivity timer, a sidelink DRX ON duration timer, and a sidelink DRX retransmission timer are preconfigured for each link, for each link type, for each traffic type, or for each UE.

26. The UE of clause 23, in which a sidelink DRX CycleStartOffset and sidelink DRX ON duration timer are set such that every sidelink DRX ON duration coincides with at least one preconfigured physical sidelink channel resource.

27. The UE of clause 23, in which a minimum value of a sidelink DRX hybrid automatic repeat request (HARQ) round trip time (RTT) timer is preconfigured for each link, for each link type, for each traffic type, or for each UE, and an actual value of the sidelink DRX HARQ RTT timer is dynamically adjusted to ensure at least one physical sidelink channel resource coincides with the duration of an incoming sidelink DRX retransmission timer.

28. The UE of clause 23, further comprising means for staying awake during a random access procedure until a last random access message is sent or received.

29. The UE of clause 23, in which no preconfigured physical sidelink channel resource coincides with a duration of the respective timer, the UE further comprising means for sleeping during an inactivity timer, a sidelink DRX ON duration timer, or a sidelink DRX retransmission timer.

30. The UE of clause 23, in which a sidelink DRX cycle setting is the same for communications with each of a plurality of transmitting UEs.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a sidelink UE (user equipment), comprising:
    receiving a first signal as part of a discontinuous reception (DRX) wake-up procedure at the beginning of a sidelink DRX ON duration;
    transmitting a response to the first signal as part of a DRX wake-up procedure;
    starting a timer after sending the response; and
    entering a sleep state upon not receiving a physical sidelink channel before the timer expires.

2. The method of claim 1, further comprising:
    receiving the physical sidelink channel before the timer expires; and
    starting a sidelink inactivity timer in response to receiving the physical sidelink channel.

3. The method of claim 2, in which the sidelink inactivity timer, a sidelink DRX ON duration timer, and a sidelink DRX retransmission timer are preconfigured for each link, for each link type, for each traffic type, or for each UE.

4. The method of claim 1, in which a sidelink DRX CycleStartOffset and sidelink DRX ON duration timer are set such that every sidelink DRX ON duration coincides with at least one preconfigured physical sidelink channel resource.

5. The method of claim 1, in which a minimum value of a sidelink DRX hybrid automatic repeat request (HARQ)

round trip time (RTT) timer is preconfigured for each link, for each link type, for each traffic type, or for each UE, and an actual value of the sidelink DRX HARQ RTT timer is dynamically adjusted to ensure at least one physical sidelink channel resource coincides with the duration of an incoming sidelink DRX retransmission timer.

6. The method of claim 1, further comprising staying awake during a random access procedure until a last random access message is sent or received.

7. The method of claim 1, in which no preconfigured physical sidelink channel resource coincides with a duration of the respective timer, the method further comprising sleeping during an inactivity timer, a sidelink DRX ON duration timer, or a sidelink DRX retransmission timer.

8. The method of claim 1, in which a sidelink DRX cycle setting is the same for communications with each of a plurality of transmitting UEs.

9. The method of claim 1, in which a sidelink DRX ON duration timer starts after drx-SlotOffset from a beginning of a subframe, where the subframe is such that [(subframe number (SFN)×10)+subframe number] modulo (drx-Long-Cycle)=drx-StartOffset for long DRX cycle, and [(SFN×10)+subframe number] modulo (drx-ShortCycle)=(drx-StartOffset) modulo (drx-ShortCycle) for short DRX cycle (if configured);
  a sidelink inactivity transmit (TX) timer starts at a transmission of the physical sidelink channel;
  a sidelink inactivity receive (RX) timer starts at reception of the physical sidelink channel;
  a sidelink DRX HARQ RTT TX timer starts at the transmission of the physical sidelink channel;
  a sidelink DRX HARQ RTT RX timer starts at a transmission of a negative acknowledgment (NACK) on a received physical sidelink channel;
  a sidelink DRX retransmission TX timer starts at expiry of the sidelink DRX HARQ RTT TX timer; and
  a sidelink DRX retransmission RX timer starts at the expiry of the sidelink DRX HARQ RTT RX timer.

10. The method of claim 1, in which the physical sidelink channel comprises a physical sidelink control channel (PSCCH).

11. The method of claim 1, in which the physical sidelink channel comprises a physical sidelink shared channel (PSSCH).

12. A sidelink (SL) UE (user equipment) for wireless communication, comprising:
  a memory, and
  at least one processor operatively coupled to the memory, the memory and the at least one processor configured:
    to receive a first signal as part of a discontinuous reception (DRX) wake-up procedure at the beginning of a sidelink DRX ON duration;
    to transmit a response to the first signal as part of a DRX wake-up procedure;
    to start a timer after sending the response; and
    to enter a sleep state upon not receiving a physical sidelink channel before the timer expires.

13. The UE of claim 12, in which the at least one processor is further configured:
  to receive the physical sidelink channel before the timer expires; and
  to start a sidelink inactivity timer in response to receiving the physical sidelink channel.

14. The UE of claim 13, in which the sidelink inactivity timer, a sidelink DRX ON duration timer, and a sidelink DRX retransmission timer are preconfigured for each link, for each link type, for each traffic type, or for each UE.

15. The UE of claim 12, in which a sidelink DRX CycleStartOffset and sidelink DRX ON duration timer are set such that every sidelink DRX ON duration coincides with at least one preconfigured physical sidelink channel resource.

16. The UE of claim 12, in which a minimum value of a sidelink DRX hybrid automatic repeat request (HARQ) round trip time (RTT) timer is preconfigured for each link, for each link type, for each traffic type, or for each UE, and an actual value of the sidelink DRX HARQ RTT timer is dynamically adjusted to ensure at least one physical sidelink channel resource coincides with the duration of an incoming sidelink DRX retransmission timer.

17. The UE of claim 12, in which the at least one processor is further configured to stay awake during a random access procedure until a last random access message is sent or received.

18. The UE of claim 12, in which no preconfigured physical sidelink channel resource coincides with a duration of the respective timer, the at least one processor further configured to sleep during an inactivity timer, a sidelink DRX ON duration timer, or a sidelink DRX retransmission timer.

19. The UE of claim 12, in which a sidelink DRX cycle setting is the same for communications with each of a plurality of transmitting UEs.

20. The UE of claim 12, in which a sidelink DRX ON duration timer starts after drx-SlotOffset from a beginning of a subframe, where the subframe is such that [(subframe number (SFN)×10)+subframe number] modulo (drx-Long-Cycle)=drx-StartOffset for long DRX cycle, and [(SFN×10)+subframe number] modulo (drx-ShortCycle)=(drx-StartOffset) modulo (drx-ShortCycle) for short DRX cycle (if configured);
  a sidelink inactivity transmit (TX) timer starts at a transmission of the physical sidelink channel;
  a sidelink inactivity receive (RX) timer starts at reception of the physical sidelink channel;
  a sidelink DRX HARQ RTT TX timer starts at the transmission of the physical sidelink channel;
  a sidelink DRX HARQ RTT RX timer starts at a transmission of a negative acknowledgment (NACK) on a received physical sidelink channel;
  a sidelink DRX retransmission TX timer starts at expiry of the sidelink DRX HARQ RTT TX timer; and
  a sidelink DRX retransmission RX timer starts at the expiry of the sidelink DRX HARQ RTT RX timer.

21. The UE of claim 12, in which the physical sidelink channel comprises a physical sidelink control channel (PSCCH).

22. The UE of claim 12, in which the physical sidelink channel comprises a physical sidelink shared channel (PSSCH).

23. A sidelink (SL) UE (user equipment) for wireless communication, comprising:
  means for receiving a first signal as part of a discontinuous reception (DRX) wake-up procedure at the beginning of a sidelink DRX ON duration;
  means for transmitting a response to the first signal as part of a DRX wake-up procedure;
  means for starting a timer after sending the response; and
  means for entering a sleep state upon not receiving a physical sidelink channel before the timer expires.

24. The UE of claim 23, further comprising:
  means for receiving the physical sidelink channel before the timer expires; and means for starting a sidelink inactivity timer in response to receiving the physical sidelink channel.

25. The UE of claim 24, in which the sidelink inactivity timer, a sidelink DRX ON duration timer, and a sidelink DRX retransmission timer are preconfigured for each link, for each link type, for each traffic type, or for each UE.

26. The UE of claim 23, in which a sidelink DRX CycleStartOffset and sidelink DRX ON duration timer are set such that every sidelink DRX ON duration coincides with at least one preconfigured physical sidelink channel resource.

27. The UE of claim 23, in which a minimum value of a sidelink DRX hybrid automatic repeat request (HARQ) round trip time (RTT) timer is preconfigured for each link, for each link type, for each traffic type, or for each UE, and an actual value of the sidelink DRX HARQ RTT timer is dynamically adjusted to ensure at least one physical sidelink channel resource coincides with the duration of an incoming sidelink DRX retransmission timer.

28. The UE of claim 23, further comprising means for staying awake during a random access procedure until a last random access message is sent or received.

29. The UE of claim 23, in which no preconfigured physical sidelink channel resource coincides with a duration of the respective timer, the UE further comprising means for sleeping during an inactivity timer, a sidelink DRX ON duration timer, or a sidelink DRX retransmission timer.

30. The UE of claim 23, in which a sidelink DRX cycle setting is the same for communications with each of a plurality of transmitting UEs.

* * * * *